United States Patent [19]

Fagerburg et al.

[11] Patent Number: 4,849,499

[45] Date of Patent: Jul. 18, 1989

[54] MELT PROCESSABLE, LIQUID CRYSTALLINE POLYESTERS

[75] Inventors: David R. Fagerburg; Winston J. Jackson, Jr., both of Kingsport; Mary B. Martin, Johnson City, all of Tenn.

[73] Assignee: Eastman Kodak Company, Rochester, N.Y.

[21] Appl. No.: 225,879

[22] Filed: Aug. 1, 1988

[51] Int. Cl.$^4$ ............................................. G08G 63/60
[52] U.S. Cl. ................................ 528/298; 528/190; 528/193; 528/272; 528/304; 528/305
[58] Field of Search ............. 528/176, 190, 193, 272, 528/298, 304, 305

[56] References Cited

U.S. PATENT DOCUMENTS

| | | | |
|---|---|---|---|
| 3,637,595 | 1/1972 | Cottis et al. | 260/47 C |
| 4,067,852 | 1/1978 | Calundans | 260/47 C |
| 4,169,933 | 10/1979 | Jackson, Jr. et al. | 528/190 |
| 4,639,504 | 1/1987 | Cottis | 528/176 |

Primary Examiner—Harold D. Anderson
Assistant Examiner—T. Mason
Attorney, Agent, or Firm—J. Frederick Thomsen; William P. Heath, Jr.

[57] ABSTRACT

A high use temperature wholly aromatic polyester resin, comprising, (i) a diacid component comprising 2,6-naphthalenedicarboxylic acid (N) and terephthalic acid (T) monomer units, wherein the ratio N:T is from about 0.25 to about 4.0, (ii) an aromatic diol component, comprising 4,4'-dihydroxybiphenyl monomer units, and (iii) 10-80 mole percent p-hydroxybenzoic acid monomer units, based on the total monomer units.

5 Claims, No Drawings

MELT PROCESSABLE, LIQUID CRYSTALLINE POLYESTERS

BACKGROUND OF THE INVENTION

1. Field of the Invention

The invention relates to wholly aromatic polyesters resins. More specifically, the invention relates to 2,6-naphthalenedicarboxylic acid—4,4'-dihydroxybiphenyl polyesters which have been modified with p-hydroxybenzoic acid. These polyesters are further modified by including terephthalic acid to lower the melting point of the polyester.

2. Discussion of the Background

Liquid crystalline polyesters are known in the art. The polyesters may be either aliphatic-aromatic polyesters such as, for example, polyethylene terephthalate modified with p-hydroxybenzoic acid, or the polyesters may be based on wholly aromatic polyesters such as those prepared from terephthalic acid and biphenol which may be optionally modified with p-hydroxybenzoic acid. A terephthalic acid/4,4-dihydroxybiphenyl/p-hydroxybenzoic acid polyester is available commercially under the Xydar ® trademark. Many of the aromatic polyesters are suitable for high use temperature applications. However, some suffer from the deficiency that melt processing temperatures are generally very high. Xydar, for example, has a melting point of 421° C.

U.S. Pat. No. 3,637,595 discloses wholly aromatic polyesters prepared from 4,4'-dihydroxybiphenyl, such as for example hydroquinone or 4,4'-dihydroxybiphenyl, an aromatic acid and p-hydroxybenzoic acid. According to this patent, the polyesters are prepared in an inert heat transfer liquid such as Therminol or a terphenyl mixture. Melting points of the polymers are very high for polyesters where the diacid is terephthalic acid. Typical softening points for terephthalic acid/ hydroquinone/-p-hydroxybenzoic acid copolyesters presented in the examples are 432°–493° C. An example using 4,4'-dihydroxybiphenyl in place of hydroquinone gave a melting point of 421° C. The single figure exhibits a sharp eutectic point in the melting behavior of the hydroquinone-terephthalic acid polyester. Similar eutectic behavior with lower melting points is predicted when isophthalic acid is substituted for terephthalic acid.

U.S. Pat. No. 4,067,852 discloses wholly aromatic polyesters prepared from 2,6-naphthalenedicarboxylic acid, p-hydroxybenzoic acid and a 4,4'-dihydroxybiphenyl. The melting points of these compositions are lower than those of the compositions prepared in U.S. Pat. No. 3,637,595. For example, a 2,6-naphthalenedicarboxylic acid/4,4'-dihydroxybiphenyl polyester modified with 75 mole percent of p-hydroxybenzoic acid is reported to give a melting point of 395° C. by differential scanning calorimetry (DSC). A 2,6-naphthalenedicarboxylic acid-hydroquinone polyester modified with 75 mole percent of p-hydroxybenzoic acid gave a melting point of 340° C. The polyesters were again prepared in an inert heat transfer fluid. In a typical example, the reaction mixture is heated for 7 hours starting at 200° C. and gradually increasing to 260° C. The temperature is then held constant at 260° C. for 15 hours, followed by stepped increases to 335° C. over a period of 5 hours and then held at 335° C. for an additional hour. These reaction times are excessive and uneconomical from a manufacturing point of view.

U.S. Pat. No. 4,169,933 discloses wholly aromatic polyesters derived from terephthalic acid, 2,6-naphthalenedicarboxylic acid, a diester of hydroquinone and p-acetoxybenzoic acid. The specific polyesters disclosed have melting points in the range of approximately 320° to 405° C. However, the patent fails to disclose or even refer to aromatic polyesters wherein the diol component consists or consists primarily of 4,4'-dihydroxybiphenyl.

U.S. Pat. No. 4,639,504 discloses a broad group of wholly aromatic polyesters in the context of a process of preparing aromatic polyesters having a low degree of coloration and excellent heat stability. The polyesters exemplified are derived solely from terephthalic acid, 4,4'-bisacetoxybiphenyl and p-acetoxybenzoic acid and had melting points in the range of 410° to 421° C. This patent does not suggest that the polyesters provided in accordance with our invention would have melting points in the range of 280° to 350° C.

A continuing need exists, therefore, for wholly aromatic polyesters which are melt processable at relatively low temperatures and yet which retain the desired properties of high tensile strength, flexural strength and impact strength.

SUMMARY OF THE INVENTION

The melt processable polyesters provided by this invention are prepared from terephthalic acid, 2,6-naphthalenedicarboxylic, a diacyl ester of 4,4'-dihydroxybiphenyl and a p-acyloxybenzoic acid. More specifically our invention concerns a polyester having a melting point of about 280° to 350° C. and a molding or fiber grade molecular weight consisting essentially of the following divalent radicals:

  (A)

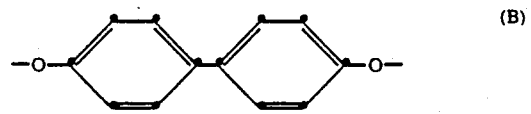  (B)

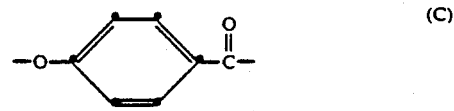  (C)

wherein R is 2,6-naphthylene and 1,4-phenylene, the mole ratio of 2,6-naphthylene to 1,4-phenylene being from about 0.25 to 4.0 and wherein radical (C) is 10 to 80 mole percent of the total moles of radicals (A), (B) and (C).

DETAILED DESCRIPTION OF THE PREFERRED EMBODIMENTS

The high use temperature wholly aromatic polyesters of the present invention are prepared from approximately equal molar amounts of a diacid component and 4,4'-dihydroxybiphenyl, and are modified with 10-80 mole percent p-hydroxybenzoic acid. The diacid component is a mixture of 2,6-naphthalenedicarboxylic acid and terephthalic acid. We have discovered that the addition of terephthalic acid results in a substantial lowering of the melting point of the liquid crystalline polyesters of the present invention.

The figure in U.S. Pat. No. 3,637,595 clearly shows that copolyesters containing terephthalic acid exhibit softening or melting points which are uniformly higher than copolyesters containing isophthalic acid. It is also significant that increasing amounts of terephthalic acid or isophthalic acid result in substantial increases in the softening or melting point of the corresponding copolyesters. The polyesters of the present invention represent a departure from these teachings.

The proportions of the monomers may be varied over a wide range to obtain various combinations of desired properties. In general, the p-hydroxybenzoic acid residue is held between 10–80 mole percent, preferably between 20–70 mole percent, based on the total of the moles of diacid, 4,4'-dihydroxybiphenyl, and p-hydroxybenzoic acid residues. The diacid and 4,4'-dihydroxybiphenyl residues normally are present in equal molar amounts. The diacid residue component is derived from 2,6-naphthalenedicarboxylic acid (N) and terephthalic acid (T) in a N:T mole ratio of which is from about 0.25 to about 4.0. Particularly preferred N:T mole ratios are about 0.5 to 2.0.

The melting points of the polyester resins of the present invention exhibit eutectic behavior with respect to the content of p-hydroxybenzoic acid. When the content of p-hydroxybenzoic acid is lower than about 25 mole percent or higher than 85 mole percent, the melting point and softening points of the polyester resins increase substantially. Polyester resins having a content of p-hydroxybenzoic acid outside the range required by the present invention are therefore difficult to process due to substantially increased melting points.

Minor amounts of additional modifying dicarboxylic acid and aromatic diol monomer units may be present in the polyesters of the present invention. Non-limiting examples of suitable diacid monomers include isophthalic acid and other naphthalenedicarboxylic acids such as, for example, 2,7-naphthalenedicarboxylic acid. Examples of suitable additional aromatic diol monomer units include hydroquinone and resorcinol. The sum of the additional diacid and aromatic diol monomers is preferably not more than 10 mole percent of the total monomer composition. However, either the additional diacid monomers or the additional aromatic diol monomers may individually constitute up to about 10 mole percent of the monomer composition.

The polyesters of the present invention may be prepared or synthesized by a wide variety of polyester forming processes which are generally known in the art. In general, processes which are useful for synthesizing high molecular weight polyesters such as those disclosed in U.S. Pat. No. 3,637,595 and U.S. Pat. No. 4,067,852 which use a heat exchange fluid are suitable for preparation of the polyesters of the present invention.

Alternatively, the present polyesters may be prepared by melt processing. In a melt process the diacids and lower alkanoyl esters of p-hydroxybenzoic acid and 4,4'-dihydroxybiphenyl are mixed together in a reaction vessel, heated and allowed to form a reaction melt. Heating results in the evolution of substantial amounts of the volatile carboxylic acids derived from the lower alkanoyl esters of p-hydroxybenzoic acid and 4,4'-dihydroxybiphenyl. Suitable lower alkanoyl esters are esters derived from carboxylic acids having from 2–5 carbon atoms, preferably 2–3 carbon atoms. Although lower alkanoyl esters are preferred, any alkanoyl ester derivative of p-hydroxybenzoic acid and 4,4'-dihydroxybiphenyl may be used so long as the corresponding acid is volatile under melt processing conditions. The ester derivative of p-hydroxybenzoic acid and the ester derivative of 4,4'-dihydroxybiphenyl may be the same or different.

After evolution of the volatile acids, the melt is raised in temperature to within the range of about 350° C. to about 400° C., usually to about 380° C. and a vacuum is applied to polycondense the polymer to increase the molecular weight of the polyester. The polycondensation may be continued until the desired molecular weight is achieved. If desired, the polycondensation process may be stopped short of the ultimate molecular weight which is desired and the solid product may be further polymerized in the solid form. Solid polymerization is generally conducted under a vacuum or under a sweep of inert gas or hot gas. Caution must be used in this approach so that the solid polymerization does not increase the melting point of the polymer to an undesired extent.

The melt polymerization may be conducted in the absence of a polycondensation catalyst or in the presence of any one of a number of catalysts known in the art.

The aromatic polyester resins of the present invention generally have melting points in the range of about 280°–350° C. The copolyester resins having melting points in the range of 300°–330° C. are particularly preferred. It is to be understood, however, that by extending the time of the initial polymerization or by conducting a solid-state polymerization following the initial polymerization, the molecular weight of the copolyester resin can be increased to whatever extent desirable.

The polyesters of the present invention have a wide range of utility and can be used to prepare fibers, films and coatings having excellent high temperature properties. They are particularly useful for coating substrates such as iron or steel with heat resistant protective coatings or for the formation of injection molded industrial and automotive parts which require high tensile strength, flexural strength and impact strength as well as heat resistance.

The polyester resins of the present invention may be used in molding applications or may be combined with one or more solid fillers or reinforcing agents to prepare filled or reinforced injection molded components. Such fillers and/or reinforcing agents are generally included in a total amount of from about 1–60 weight percent based on the resulting molding compound. Suitable reinforcing materials include fibers such as glass, carbon, synthetic polymeric, metal and rock wool fibers. Suitable filler materials include calcium silicate, silica, clays, talc, mica, polytetrafluoroethylene and graphite. Additional additive such as colorants, dyes and processing aids may also be added in amounts which do not adversely affect the strength and impact resistance of the polyester resins.

Other features of the invention will become apparent during the course of the following description of exemplary embodiments which are given for illustration of the invention and are not intended to be limiting thereof.

EXAMPLES

Comparative Example 1

This example illustrates the preparation of a polyester of 2,6-naphthalenedicarboxylic acid and 4,4'-dihydroxydiphenyl modified with 58 mole percent of p-hydroxybenzoic acid. In a 100 mL flask were placed the following: 8.65 g (0.04 mol) of 2,6-naphthalenedicarboxylic acid (N), 10.81 g (0.04 mol) of 4,4'-bis-acetoxybiphenyl (BP), and 19.82 g (0.11 mol) of p-acetoxybenzoic acid (PHB). The flask was fitted for stirring, inert gas introduction, and volatile gas removal. The mixture was stirred under nitrogen and the flask immersed in a 200° C. metal bath. After 26 minutes of reaction, the temperature was increased to 380° C., which was reached after 44 minutes. After 15 minutes at 380° C., a vacuum was applied to the reaction mixture for 25 minutes. After that time, the bath was removed and the polymer was allowed to solidify under inert gas. The polymer thus produced showed a melting point by DSC of 358° C. (second cycle melting was at 356° C.).

EXAMPLE 2

This example illustrates that the addition of terephthalic acid to the copolymer results in a lower melting point. The N:T molar ratio is 74:26, or 2.9, and the PHB content is 67 mole percent. The reactants were as follows: N—4.97 g (0.023 mol), T—1.33 g (0.008 mol), BP—8.11 g (0.03 mol), and PHB—21.6 g (0.12 mol). The flask was immersed in a bath preheated to 200° C. Immediately upon immersion, the temperature controller was increased to 325° C. and after 18 minutes to 360° C. At 1 hour and 7 minutes reaction time the temperature was changed to 380° C. and a full vacuum applied to the reaction mixture. After 35 minutes under vacuum, the bath was removed and the polymer allowed to solidify under nitrogen. The product exhibited a DSC melting point of 311° C. even though the p-hydroxybenzoic acid content is 67 mole percent vs. the 58 mole percent of Example 1.

EXAMPLE 3

A polymer was prepared in substantially the same manner as Example 2 except that the reactants were adjusted to give a molar ratio of N:T of 50:50, or 1.0, all other materials being held constant. The product polymer had no melting point by DSC, indicating no strongly developed crystallinity and could be pressed into tough, creasable films at a 530° C. platten temperature.

EXAMPLE 4

A polymer was prepared substantially as in Examples 2 and 3 but with an N:T molar ratio of 25:75, or 0.33. The polymer showed no melting peak by DSC but was pressed into a tough, creasable film at 350° C. platten temperature.

EXAMPLE 5

The following materials were charged to a flask which was then purged three times with nitrogen and vacuum and immersed in a metal bath preheated to 320° C.

N—9.7 g, 0.045 mol,
T—5.0 g, 0.03 mol,
BP—20.3 g, 0.075 mol, and
PHB—4.5 g, 0.025 mol.

Upon immersion in the bath, the bath temperature controller was first raised to 380° C. and then, after 30 minutes to 400° C. After 90 minutes, vacuum was applied to the flask to achieve a pressure of 0.5 torr. After 22 minutes, a very high viscosity melt was obtained, the bath was removed and the melt was cooled under nitrogen. The composition thus obtained could be pressed into a tough film at 350° C. The polymer showed no transition by DSC up to 400° C. The N:T molar ratio is 60:40, or 1.5, and the PHB content is 14 mole %.

The inherent viscosity of the copolyesters of this invention cannot be determined because the copolyesters of this invention are insoluble in typical solvents used for determining inherent viscosity. Although the inherent viscosity of the copolyesters of the invention has not been measured, the molecular weights of the copolyesters of the invention are high enough to be in the fiber forming range. The minimum fiber forming molecular weight of the polymer is thought to be around 5,000. In most cases copolyesters of the invention have molecular weights above 8,000 and can have molecular weights as high as around 20,000 and in some instances the molecular weights can range up to 25,000 or even higher.

Obviously, numerous modifications and variations of the present invention are possible in light of the above teachings. It is therefore to be understood that within the scope of the appended claims, the invention may be practiced otherwise than as specifically described herein.

We claim:

1. A melt processable polyester having a molding or fiber grade molecular weight consisting essentially of the following divalent radicals

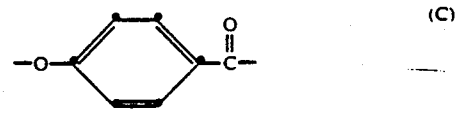

wherein R is 2,6-naphthylene and 1,4-phenylene, the mole ratio of 2,6-naphthylene to 1,4-phenylene being from about 0.25 to 4.0 and wherein radical (C) is 10 to 80 mole percent of the total moles of radicals (A), (B) and (C).

2. The polyester of claim 1 having a melting point below 350° C. wherein radical (C) is about 20 to 70 mole percent of the total moles of radicals (A), (B) and (C).

3. The polyester of claim 2 wherein the mole ratio of 2,6-naphthylene to 1,4-phenylene is about 0.5 to 2.0.

4. A molded article of the polyester of claim 1.

5. A molded article of the polyester of claim 2.